Patented June 30, 1931

1,812,335

UNITED STATES PATENT OFFICE

FREDERICK C. HAHN, OF WILMINGTON, DELAWARE, ASSIGNOR TO E. I. DU PONT DE NEMOURS & COMPANY, OF WILMINGTON, DELAWARE, A CORPORATION OF DELAWARE

COATING COMPOSITION

No Drawing. Application filed July 27, 1928. Serial No. 295,858.

This invention relates to the art of coating compositions, and more particularly to coating compositions containing cellulose acetate.

The quick-drying coating compositions, often referred to as lacquers, now on the market are made out of cellulose nitrate, one or more resins, one or more softeners and a solvent. For various reasons, it is desirable to use cellulose acetate as the base for such coating compositions but I have found that none of the ordinary natural resins are compatible with cellulose acetate, hence it is not possible to make these compositions by merely substituting cellulose acetate for cellulose nitrate.

I have found, however, that resin-like materials which are readily miscible with cellulose acetate can be prepared by treating a monoalkyl ether of glycerine with organic acids containing two or more carboxyl groups.

It is therefore an object of this invention to produce coating compositions using cellulose acetate as the base.

With the above and other objects in view, which will be apparent as the description proceeds, I have set forth below several embodiments of my invention by way of illustration and not as a limitation.

The resin-like materials used in the following compositions are prepared by heating substantially 1 mol of monoethylin or monomethylin with 1 mol of a dicarboxylic acid, for example, phthalic or oxalic acid, at 179–250° C. for 3–14 hours.

Example 1

| | Pts. by wt. |
|---|---|
| Cellulose acetate | 12 |
| Monoethylin phthalate | 12 |
| Diethyl phthalate | 6 |
| Solvent | 79 |

Example 2

| | Pts. by wt. |
|---|---|
| Cellulose acetate | 12 |
| Monoethylin oxalate | 3 |
| Dibutyl phthalate | 6 |
| Solvent | 179 |

Example 3

| | Pts. by wt. |
|---|---|
| Cellulose acetate | 12 |
| Monomethylin phthalate | 3 |
| Diethyl phthalate | 6 |
| Solvent | 179 |

It will be apparent that a wide variety of solvents may be used in forming coating compositions of the type set forth herein, but a solvent which I have found highly satisfactory consists of acetone 17%, ethyl acetate 10%, ethyl alcohol 8%, toluene 20%, monomethyl ether of ethylene glycol 22%, acetone oil fraction boiling from 90–150° C. 20%, and diacetone alcohol 3%.

The above coating compositions are produced by mixing the ingredients in the proportions indicated in the ordinary way, Example 1 forming a coating composition suitable for brushing, and Examples 2 and 3 forming coating compositions suitable for spraying.

Although the examples set forth above are limited to the use of resin-like materials formed by using phthalic acid and oxalic acid, it will be understood that other organic acids containing two or more carboxyl groups, such as tartaric acid may be substituted for phthalic acid or oxalic acid for reaction with monoethylin or monomethylin or any desired mixtures of these acids may be used for this purpose.

It will be apparent that in place of monoethylin or monomethylin I can use other monoalkyl ethers of glycerine, such as monopropylin and monobutylin.

In making the resin-like materials disclosed herein it is sometimes desirable to vary the proportions of the ingredients and use an excess of one or the other. In such cases, if it is desired to remove the excess, this may be done in any known way, as by blowing an inert gas through the heated mass.

The process of forming resin-like materials by treating monoalkyl ethers of glycerine with organic acids containing two or more carboxyl groups is not claimed herein but is disclosed and claimed in a co-pending application by Walter E. Lawson, Serial No. 295,837 filed of even date herewith.

As many apparently widely different embodiments of this invention may be made without departing from the spirit thereof, it is to be understood that I do not limit myself to the foregoing examples, proportions or description except as indicated in the following patent claims.

I claim:

1. A coating composition containing cellulose acetate, a resinous polybasic acid ester of a monoalkyl ether of glycerine, a softener and a solvent.

2. A coating composition containing cellulose acetate, a phthalate of a monoalkyl ether of glycerine, a softener and a solvent.

3. A coating composition containing cellulose acetate, monoethylin phthalate, a softener and a solvent.

4. A coating composition containing 12 parts by weight of cellulose acetate, 12 parts by weight of monoethylin phthalate, 6 parts by weight of a softener, and 79 parts by weight of a solvent.

5. The combination of claim 4 in which the solvent contains 17% of acetone, 10% of ethyl acetate, 8% of ethyl alcohol, 20% of toluene, 22% of monomethyl ether of ethylene glycol, 20% of acetone oil fraction boiling from 90 to 150° C., and 3% of diacetone alcohol.

In testimony whereof, I affix my signature.

FREDERICK C. HAHN.